C. A. O'NEILL.
RESILIENT WHEEL.
APPLICATION FILED DEC. 16, 1918.
1,321,545.
Patented Nov. 11, 1919.
2 SHEETS—SHEET 1.
Fig. I.
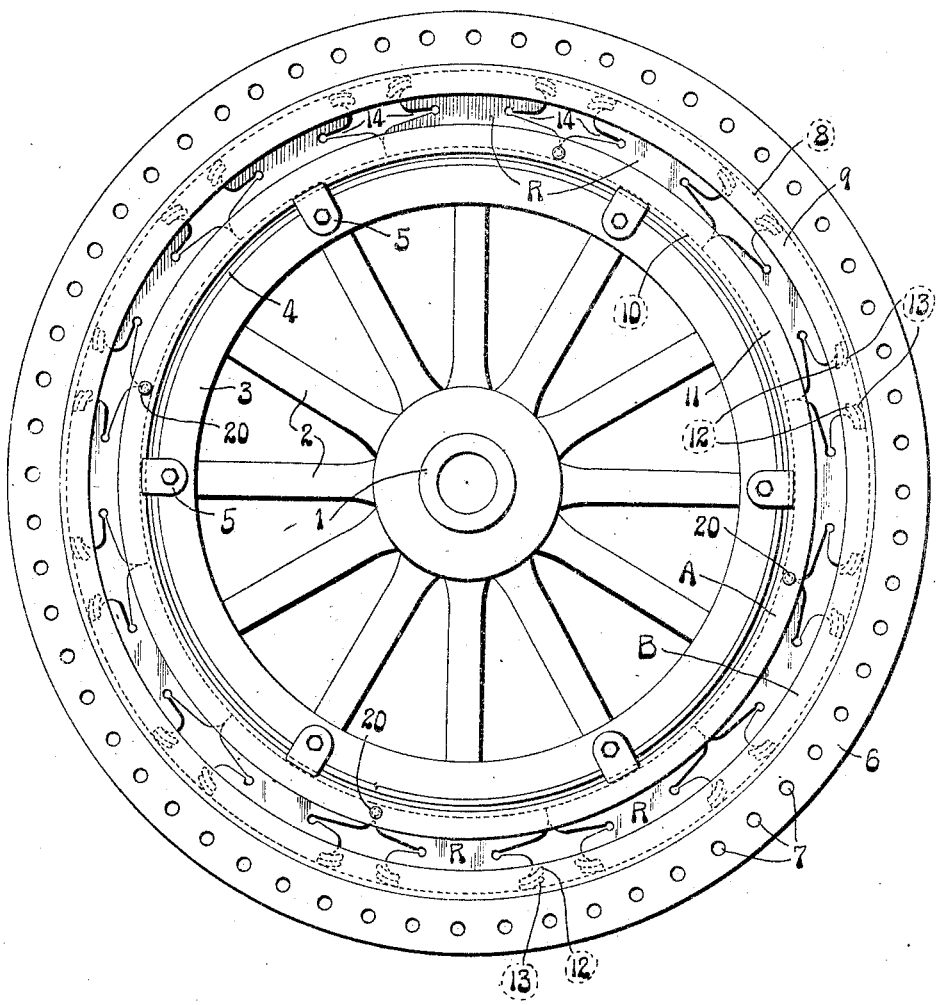
INVENTOR.
C. A. O'Neill
BY
ATTORNEYS

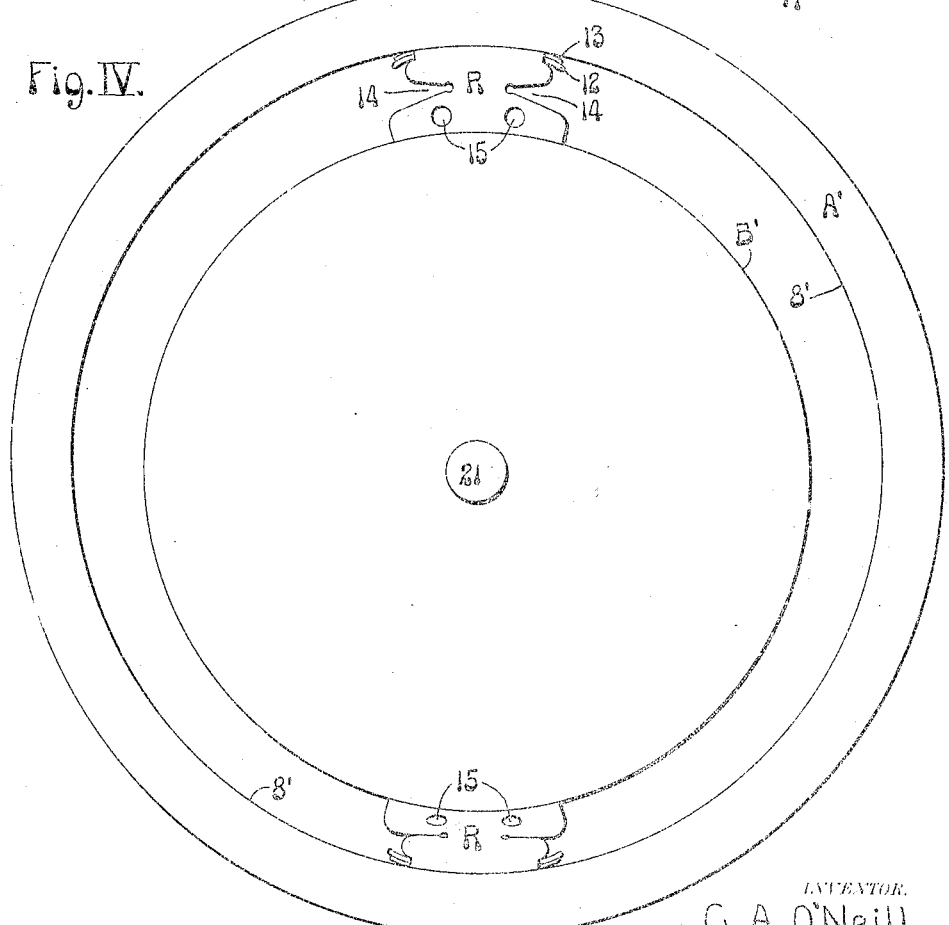

UNITED STATES PATENT OFFICE.

CHARLES A. O'NEILL, OF REVERE, MASSACHUSETTS, ASSIGNOR TO DEMOUNTABLE SPRING TIRE COMPANY, OF NEW YORK, N. Y., A CORPORATION OF MISSOURI.

RESILIENT WHEEL.

1,321,545.

Specification of Letters Patent.   Patented Nov. 11, 1919.

Application filed December 16, 1918. Serial No. 267,029.

*To all whom it may concern:*

Be it known that I, CHARLES A. O'NEILL, a citizen of the United States of America, a resident of Revere, in the county of Suffolk and State of Massachusetts, have invented certain new and useful Improvements in Resilient Wheels, of which the following is a full, clear, and exact description, reference being had to the accompanying drawings, forming a part of this specification.

My invention relates to improvements in resilient wheels, and more particularly to a wheel having shock absorbers which do not contact with the roadway. One of the objects of the invention is to provide in a wheel of this kind rubber shock absorbing elements adapted to most effectively withstand the peculiar service conditions which will be hereinafter pointed out.

The shock absorbers form part of expanding clutch devices which preferably travel or creep on an annular track, so as to allow the inner portion of the wheel to turn faster than the outer portion. To efficiently perform their several functions, the shock absorbers must be designed to properly cushion both the light and severe shocks, and they must also retain the clutches in engagement with the annular track. My object is to produce such expanding shock absorbers made of bodies of rubber having their elements arranged to furnish the desired variable resistance to the shocks, and also adapted to properly actuate their companion clutch elements. These rubber elements can be designed to obtain a combination of results not obtainable from metal springs and, furthermore, they are strong, durable, noiseless and they will not crystallize like metal springs.

Another object is to avoid destructive stresses which have heretofore very materially retarded the development of resilient wheels of the general type herein shown.

Owing to the great demand for shock absorbing devices superior to pneumatic tires, various types of shock absorbing elements have been placed between inner and outer wheel rims to absorb the shocks without coming into actual contact with the ground. However, the resilient members interposed between rotating wheel rims are subjected to peculiar stresses due not only to the load and obstructions in the roadway, but also to the transmission of a rotary movement from one of the rims to the other. The peculiar co-action of these various stresses has resulted in destructive strains which, actual tests have shown, soon crystallize metal springs, and in fact the deterioration of the resilient members has been so rapid that many persons skilled in this art have been convinced that shock absorbers mounted within the wheel cannot be designed to successfully withstand the service conditions. This, however, I believe is due partly to the fact that the causes of all of the strains are not generally understood, and partly to the use of metal springs and improperly designed rubber shock absorbers. Since the present invention is based upon a combination of elements whereby certain severe strains are eliminated, or reduced to a minimum, I will hereinafter endeavor to point out the causes of these strains in an ordinary resilient wheel and to describe the peculiar manner in which they are relieved by the new device.

Heretofore the practice has been to mount the resilient shock absorbing members between an inner wheel rim and an outer wheel rim, and to positively prevent one rim from rotating independently of the other. This is usually accomplished by fastening the shock absorbing members to both rims, but in some instances rigid stop members are used to prevent independent rotation of the rims. According to the present invention, one rim is permitted to turn relative to the other, and the resilient clutch devices including the rubber shock absorbers are permitted to travel continually in the annular space between the rims. To appreciate the advantage of this, it will be necessary to clearly understand why one of the rims tends to turn faster than the other, and to fully appreciate the effect of the constant stresses resulting from this tendency. Before attempting to point out these features, I will describe the specific structure illustrated in the accompanying drawings.

Figure I is a side elevation of a vehicle wheel provided with a resilient tire embodying the features of this invention.

Fig. II is an enlarged side elevation, partly in section, showing one of the resilient clutch devices mounted between the wheel rims.

Fig. III is a transverse section taken approximately through the center of the structure shown in Fig. II.

Fig. IV is a diagrammatical view showing diametrically opposite clutch devices, and also showing one of the wheel members in an extreme position eccentric to the other wheel member, the rubber member of the lower clutch device being displaced and confined under a high degree of pressure in the relatively narrow space at the lower portion of the wheel, while the rubber member of the upper clutch device is expanded in the wider space at the upper portion of the wheel, so as to maintain the clutch device in engagement with the wheel rims.

The wheel shown in Fig. I comprises a hub 1, spokes 2, a felly 3 and a metal band 4 surrounding the felly to receive a demountable rim. 5 designates fastening devices of a well known type adapted to secure a demountable rim to the wheel. The wheel is thus equipped to receive a demountable rim, and it may be considered as a standard automobile wheel.

The resilient demountable tire shown in Figs. I, II and III comprises an inner rim A adapted to be secured by the fastening devices 5, an outer rim B surrounding the inner rim, and a rubber tire 6 surrounding the outer rim. The rubber tire may be provided with transverse openings 7 in its side faces, and this tire is preferably vulcanized on the outer rim.

The outer rim B also includes an annular web 8, which will be hereinafter termed an annular track, and side flanges 9 extending inwardly from said annular track. The inner rim A consists of an annular web 10 and annular side flanges 11 extending outwardly from said web.

An annular row of resilient expanding clutches is arranged circumferentially of the annular track 8 and interposed between the inner and outer wheel rims to form a yielding frictional connection which allows the inner rim to turn, or creep, relative to the outer rim. Each of these resilient expanding clutches comprises a rubber pressure-exerting member R mounted between the side flanges of the inner and outer rims; relatively firm traction shoes 12 carried by the rubber members R, and traction soles 13 secured to said traction shoes and engaging the annular track 8.

The bodies of rubber R constituting the pressure-exerting members are elongated circumferentially of the annular track and provided at their ends with openings 14 having diverging walls adapted to move toward and away from each other, to provide for the radial displacement of the rubber members R. Each of these bodies of rubber also has transverse openings 15 between its ends, as shown most clearly in Figs. II and IV. The ends of the traction members 12 and 13 are turned away from the annular track 8 to enable the clutch devices to creep more freely on said track. The traction soles 13 may be made of fiber or of a special composition, such as ordinarily used in making the brake linings of automobiles, the object being to firmly grip the metal track 8 when the rubber members R are under high pressure, and also to use a material which will not be rapidly worn away by frictional engagement with the metal track. The traction shoes 12 are preferably made of metal and each of these shoes has a central tubular extension 16 (Figs. II and III) projecting into a radial opening 17 in one of the rubber members. These tubular metal members 16 move radially with the clutch devices, and they serve as reinforcing elements for the rubber members R.

The bodies of rubber R are assembled between the rims under pressure, and theoretically the pressure exerted by the rubber should be great enough to support the normal load of the vehicle, but in actual practice the inner rim may be forced downwardly a slight distance by the weight of the vehicle and its contents, so as to occupy a position eccentric to the outer rim. If the initial, or normal, pressure of the rubber members is great enough, the load will be supported by the wheel without materially displacing or bending the rubber, and in this event bodies of rubber will not be subjected to injurious constant flexure when the vehicle is traveling over a smooth roadway.

To enable the bodies of rubber to be assembled under pressure, each of the tubular members 16 may be threaded internally to receive one end of a screw 18, shown by dot and dash lines in Fig. III, the screw having a head 19 adapted to engage the rim A, and said rim being perforated to receive the screw. In assembling the parts the screws 18 are tightened to move the traction shoes 12 toward the clutch devices, thereby permitting said clutch devices to be placed between the flanges 9 of the outer rim, and thereupon the screws 18 are loosened and removed from the structure to permit the expanding rubber to force the traction soles 13 into engagement with the annular track 8. The bodies of rubber may thus be assembled and confined between the rims under pressure, and this initial or normal pressure must be great enough to maintain the traction soles 13 in engagement with the annular track. When the outer rim is forced upwardly, the annular space between the rims is widened at the upper portion of the wheel, as shown by Fig. IV, and since the bodies of rubber R are assembled under pressure, the rubber members in the relatively wide space will expand to retain the clutch devices in engagement with the annular track.

It will now be understood that the clutch devices are not attached or actually fastened to the outer rim. They are permitted to travel or creep on the unobstructed annular track 8, as will be hereinafter described. Owing to the expansive force of the bodies of rubber which are seated on the annular web 10 of the inner rim, the rubber itself is forced into firm frictional engagement with said web 10, and this friction between the metal and rubber may be great enough to prevent the rubber from creeping on said web 10. However, if desired, a few transverse bolts 20 (Figs. I and II) may be inserted through the side flanges 11 at points between the adjacent ends of rubber members R so as to positively prevent the rubber from creeping on the inner rim. The ends of adjacent bodies of rubber R preferably abut against each other as shown in Figs. I and II.

When the two rims A and B are concentric, they revolve together at the same speed, and theoretically the rims should be normally concentric with each other. However, to enable the shock absorbing elements to perform their functions, one rim must move to an eccentric position, and since this may be considered as a normal or very frequent condition, it will be interesting to carefully consider the conditions existing when one rim is eccentric to the other.

In the diagrammatical view (Fig. IV) I have shown one of the rims in an eccentric position relative to the other, and although only two of the bodies of rubber R appear in this diagrammatical view, it is to be understood that the complete structure will include an annular row of the bodies of rubber, as shown by Fig. I. In Fig. IV, A' designates the outer rim provided with an annular track 8', and B' designates the inner rim to which the axle 21 is secured. When the rims occupy the eccentric positions, the shock absorbing elements (bodies of rubber R) at the lower portion of the wheel are under a very high degree of pressure, while the upper shock absorbers in the relatively wide space at the top of the wheel are comparatively free, the power being transmitted from the inner rim, through the shock absorbing members at the lower part of the wheel, and thence to the lower portion of the outer rim. The bodies of rubber R at the top of the wheel are permitted to expand and retain the friction soles 13 in contact with the annular track, but they are comparatively free to slip circumferentially of said track, so the driving power must be transmitted from the center of the axle 21 (Fig. IV) to the lower portion of the outer rim, where the bodies of rubber are most firmly held between the rims. It is important to observe that the eccentric members illustrated by Fig. IV closely resemble a small friction drive gear contacting with a larger driven gear. When gears of this kind coöperate with each other, the smaller gear will turn faster, or make more revolutions, than the larger gear, and in the new structure the inner rim likewise tends to turn faster than the outer rim. In Fig. IV the center of the inner rim is displaced downwardly relative to the outer rim, and the power is transmitted from said center to the lower portion of the annular track A'. Therefore, the inner wheel elements, including the axle and the bodies of rubber R, may be considered as a relatively small friction drive gear having a diameter equal to twice the distance from the center of the axle to the lower portion of the annular track 8'; while the outer rim may be considered as a friction driven gear equal in diameter to the annular track 8'. In comparing these devices to speed-changing gearing, it must be borne in mind that the driving power is transmitted through the lower portion of the wheel, and for this reason the distance from the center of the axle to the lower portion of the annular track 8 may be considered as one-half of the distance of the inner driving gear. The point I desire to make clear is that whenever the inner rim occupies an eccentric position, it tends to turn faster than the outer rim, and that this tendency varies in accordance with variations in the distance between the axis of the annular track 8' and the center of the axle 21.

In thousands of revolutions, the number of revolutions made by the inner rim will greatly exceed the revolutions of the larger outer rim. Supposing that the rims were positively connected together by means of any devices preventing the inner rim from turning at a relatively high speed; the connecting devices would then have to resist the constant strains due to the natural tendency of one rim to turn faster than the other, and if the connections were yieldable they would be gradually tensioned until their resistance was great enough to positively overcome the tendency of the inner rim to turn at the comparatively high speed. It is difficult to conceive the action of all of the peculiar stresses which would occur in a yieldingly connected device of this kind, but it is clear that the yielding connections would be constantly under tension and that the degree of tension would change in accordance with changes in either the load or power, and also in response to variations in the resistance offered to the rotary movement of the outer rim, thereby causing vibrations in the yielding connections. The tendency of one rim to turn faster than the other would also change in response to variations in the distance between the eccentric centers of the rims.

Any positive driving connection preventing the inner rim from turning faster than the outer rim will very materially affect the shock absorbing properties of the resilient members between the rims, at the same time causing severe stresses and vibrations tending to destroy the resilient members. If the resilient rubber members R were used to connect the rims, they would have to support the load, resist the shocks, transmit power to the outer rim, and while performing all of these several functions they would be constantly subjected to the severe stresses due to the tendency of the small inner rim to turn faster than the outer rim. The simultaneous co-action of these different destructive forces would not only tend to shorten the life of resilient members, but it would also greatly impair their efficiency; for it will be apparent that the rubber shock absorbers cannot afford the desired resiliency while constantly tensioned and distorted by varying stresses resulting from the tendency of the large and small rims to turn at different rotary speeds. Otherwise stated, if the rotary movement is transmitted through driving members which prevent one rim from turning relative to the other, all of these driving members would be subjected to constant bending stresses tending to move all of them circumferentially of the rims, such circumferential bending stresses being due partly to the transmission of power through all of the connecting members and partly to the constant tendency of the inner rim to turn faster than the outer rim; and owing to the constant changes due to the rotary movement of the heavily loaded eccentric rims, there would also be constant destructive vibrations resulting from rapid changes in the forces acting upon all of the distorted connecting members.

Actual tests have shown that a positive driving connection between the rims is unnecessary, and in the new device a number of important advantages are gained by eliminating this connection and permitting the inner rim to turn or roll in the outer rim. The weight of the vehicle, the expansive force of the elongated rubber shock absorbers and the friction between the elongated traction members and their smooth annular track 8, provides a highly desirable friction drive. The traction members, carried by the rubber shock absorbers at the lower portion of the wheel, contact with their smooth track in a manner corresponding to the contact between a locomotive wheel and its smooth track, or to the frictional contact between an automobile tire and the ground. Further, the friction at the elongated traction members is even greater, due to the greater area in contact and the expansive force of the elongated bodies of rubber R. It is, therefore, unnecessary to fasten or attach the inner rim to the outer rim.

At the upper portion of the wheel, the friction clutches formed by the rubber members and the traction members are comparatively free, and there being no positive driving connection, the free individual resilient members are permitted to move, or creep, circumferentially of the annular track 8. In one revolution the circumferential slippage is very slight, but in traveling several miles the total slippage may amount to one or more complete revolutions, depending upon the conditions under which the wheel is driven. However, whenever one of the rims is forced to an eccentric position, either by the weight of the vehicle or by the shocks due to irregularities in the roadway, the inner rim is free to follow its natural tendency to turn or roll faster than the outer rim.

If the rims were held concentric, the driving power would be transmitted through all of the rubber members R and the bodies of expansive rubber would be subjected to a peculiar circumferential tensioning action, but when the eccentric inner rim is free to roll on an annular track, as herein shown, the flexure of the rubber is approximately limited to a radial movement. The equilibrium of the center of gravity of the load, of the outer rim and of the axle is not materially disturbed by a movement of this kind, the resilient members being so mounted that the centers of gravity of these three elements are maintained in constant equilibrium.

The resilient members are not subjected to constant vibrations or to other destructive strains resulting from the tendency of the inner rim to turn in the outer rim, and by absolutely eliminating these strains I leave the shock absorbers free to perform their functions most effectively; at the same time providing in the wheel itself a series of traction members which gradually creep on an annular track to enable the rotary motion to be transmitted without materially injuring the resilient rubber members. The free rolling motion on a smooth track can be readily borne by the shock absorbers carried by the inner rim, and although the traction members are permitted to slip in the relatively wide space at the upper part of the wheel, the friction at this point is comparatively slight. The actual slippage is not great enough to rapidly wear away the friction surfaces.

A careful study of the problems involved in a wheel of this kind has shown that there are certain features essential to the successful operation of the wheel, and to accomplish all of the important results herein pointed out the complete structure should consist of a combination of elements including certain desirable features of the traveling expanding clutches herein disclosed.

First, all of the expanding clutches must be retained in engagement with the annular track. This is accomplished by assembling the resilient members under pressure. To avoid constant destructive flexure when the wheel is traveling on a smooth roadway, the expansive force of the resilient members is preferably great enough to retain the rims in approximately concentric positions.

Second, the service shocks must not rapidly destroy the resilient members, and this is avoided, preferably, by the use of rubber designed and reinforced to withstand the shocks.

Third, the resilient members, when expanded as shown at the top of Fig. IV, should offer only a low resistance to the slippage of the traction members, but in absorbing the shocks the resilient members should offer a gradually increasing resistance which must be very great when they are forced to the extreme condition suggested at the lower portion of Fig. IV. The desired minimum and maximum resistance must be obtained from resilient members which can partake of only a limited motion in absorbing the shocks, for the extreme eccentric positions of the rims can not be very far from the concentric positions. In other words, a wheel rim cannot be greatly displaced in absorbing the shocks and both the light and severe shocks should be effectively absorbed by resilient members which are not greatly displaced by the shocks. In the preferred form of the invention, the resilient rubber members R are formed with openings 14 and 15 enabling them to afford the desired resiliency for both light and severe shocks. Although vulcanized rubber cannot be materially compressed, it can be displaced under pressure, and the open bodies of rubber herein shown can be readily displaced and assembled under pressure to obtain the desired constant contact at the annular track.

It is also important to observe that the rubber members having the openings 14 and 15 will yield freely in cushioning the light shocks, and when subjected to a shock severe enough to approximately close the openings, a very high resistance will be gradually obtained. In response to the severe shocks, the converging walls of the openings 14 will gradually approach each other, contacting with each other first only near the inner ends of the V-shaped openings, but as the displacement of the rubber continues the converging walls will gradually close the openings 14, thereby compelling the extended end portions of the rubber member to coöperate with the middle portion in absorbing the severe shocks. The resistance of the open rubber members is thus gradually increased by a gradual closing of the openings, and by varying the shape and dimensions of the diverging rubber elements, the rubber members can be properly designed to obtain the desired shock absorbing properties for either a light pleasure vehicle or for a heavy commercial truck.

Another important feature of the improvement is based upon the fact that the resilient members should be free to yield radially of the wheel, and although they creep circumferentially of the annular track, undue circumferential flexure should be avoided. The resiliency is afforded mainly by the approximately radial flexure, and if subjected to unnecessary circumferential bending stresses the shock absorbing properties of the resilient members would be impaired. The relatively stiff tubular members 16, preferably formed integral with the metal traction shoes 12, extend into radial openings in the rubber member R, and these members 16 do not tend to prevent radial movements of the rubber. However, the circumferential thrusts resulting in the creeping of the clutches are transmitted through these stiff radial members 16. Therefore, the members 16 tend to prevent circumferential flexure of the traveling resilient members. In addition performing this important function, the radial members 16 may be used to secure the traction shoes to the rubber and also to retain said shoes in radial alinement with their companion rubber members.

I claim:

1. In a resilient wheel, the combination of an inner wheel member, an outer wheel member surrounding said inner wheel member, one of said wheel members being provided with an annular track, and an annular row of resilient expanding clutches arranged circumferentially of said annular track and interposed between said wheel members so as to form a yielding frictional connection which allows one of said wheel members to turn faster than the other, said resilient expanding clutches comprising traction members engaging said annular track and expanding rubber pressure-exerting members whereby all of said traction members are positively retained in engagement with said annular track, the ends of each of said traction members being turned away from said annular track each of said rubber pressure exerting members being provided with a radial opening, and relatively stiff thrust members tending to prevent circumferential flexure of said expanding rubber members, each of said thrust members being extended from one of said traction members and mounted in one of said radial openings so as to move radially and circumferentially with said traction members and rubber members.

2. In a resilient wheel, the combination of an inner wheel member, an outer wheel member surrounding said inner wheel member, one of said wheel members being provided with an annular track, and an annular row of resilient expanding clutches arranged circumferentially of said annular track and interposed between said wheel members so as to form a yielding frictional connection which allows one of said wheel members to turn faster than the other, said resilient expanding clutches being adapted to creep along said annular track, said resilient expanding clutches comprising expanding rubber pressure-exerting members, the normal pressure or expansive force of said expanding rubber pressure-exerting members being great enough to approximately balance the normal load to which the wheel is subjected and to positively retain all of said expanding clutches in engagement with said annular track.

In testimony that I claim the foregoing I hereunto affix my signature.

CHARLES A. O'NEILL.